Nov. 15, 1938.   H. S. GATES   2,137,082
ELECTRICAL APPARATUS
Filed Feb. 6, 1936

WITNESSES:
Michael Stark
James N. Ely

INVENTOR
Henry S. Gates.
BY Ezra W. Savage
ATTORNEY

Patented Nov. 15, 1938

2,137,082

UNITED STATES PATENT OFFICE 2,137,082

ELECTRICAL APPARATUS

Henry S. Gates, Sharon, Pa., assignor to Westinghouse Electric & Manufacturing Company, East Pittsburgh, Pa., a corporation of Pennsylvania Application February 6, 1936, Serial No. 62,663

6 Claims. (Cl. 200—5)

This invention relates to electrical apparatus and particularly to transformer grounding switches.

In the operation of electrical apparatus such as transformers, it is desirable to disconnect the transformer from the power circuit when repairs or changes are to be made and to so ground the feeder that the transformer is not again connected to the circuit until the repairs or changes have been made. It is also desirable to provide a grounding switch such as cannot be operated to its "ground position" when the transformer or feeder is energized.

Heretofore different types of grounding switches have been developed whereby the switch cannot be operated to its "grounding position" when the transformer or feeder is energized. These grounding switches, however, require complicated mechanical and electrical locking and switching mechanisms for providing the desired operation from the disconnected or "open position" to the "grounding position".

An object of this invention is to provide a switch for connecting the conductors of an electrical circuit to the windings of an electrical apparatus or to ground and for disconnecting them therefrom and to provide for preventing the operation of the switch to its "ground position" when the apparatus is energized.

Another object of this invention is to provide a three position grounding switch, the movable switching members of which are adapted for reciprocal movement in connecting the conductors of an electrical circuit to the windings of a transformer or to ground and for disconnecting them, and to provide for preventing a movement of the switch members to connect the conductors to the ground when the conductors are disconnected without first connecting the conductors to the transformer windings.

A further object of this invention is to provide for translating rotary movement into linear movement to reciprocally actuate the switch members of a three position grounding switch in connecting the conductors of an electrical circuit to the windings of a transformer or to ground and for disconnecting them therefrom and to provide for preventing a movement of the switch members to connect the conductors to ground when the conductors are disconnected without first connecting the conductors to the transformer windings.

Other objects will be apparent from the following description when taken in conjunction with the accompanying drawing, in which—

Figure 1:
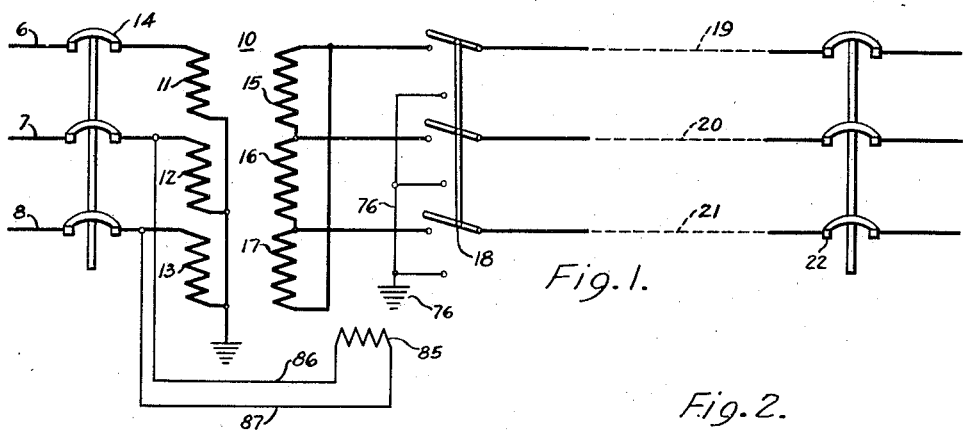
Figure 3:
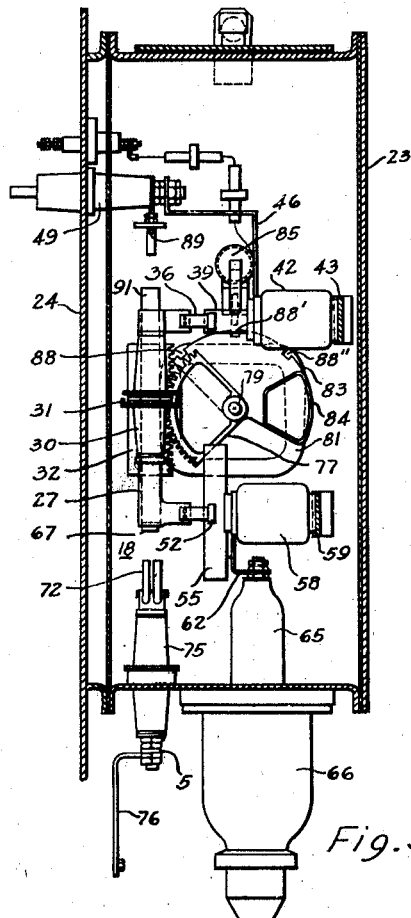
Figure 2:
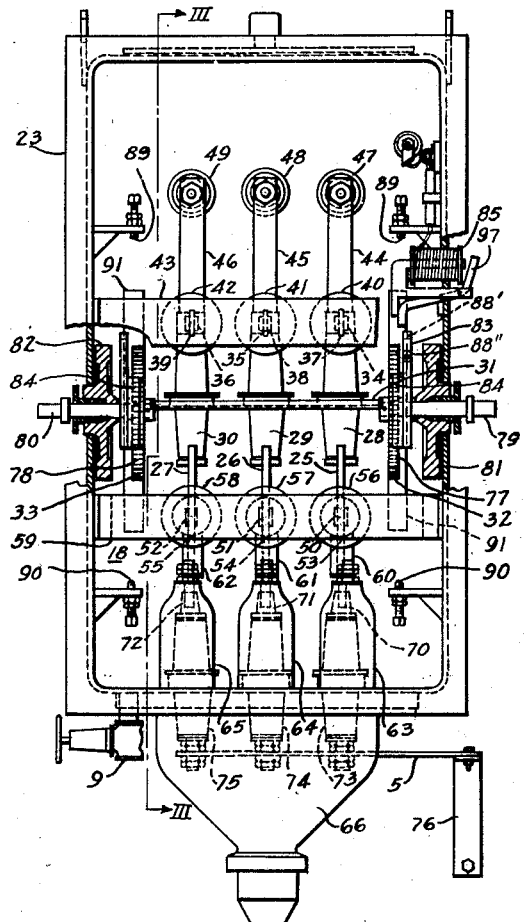

Figure 1 is a schematic view illustrating the three phase transformer, its primary and secondary circuits and a three-phase grounding switch connected in one of the circuits, Fig. 2 is an elevational view partly in section of a grounding switch and its operating mechanism mounted within a suitable switch casing, the front cover of which is shown removed, and Fig. 3 is a sectional view taken along the line III—III of Fig. 2, showing a portion of the switch and its operating mechanism.

Like reference numerals in the different figures of the drawing denote like parts.

This invention is illustrated as embodied in a circuit in which it is desired to protect an electrical apparatus such as a transformer.

Referring to the drawing and Fig. 1 thereof in particular, this invention is illustrated in a circuit in which a transformer 10 having low voltage windings 11, 12 and 13 is connected by means of circuit breaker 14 to the three conductors of a low voltage three-phase circuit 6, 7 and 8. The high voltage windings 15, 16 and 17 of the transformer 10 are connected through a three-phase grounding switch, shown generally at 18, to high voltage feeder conductors 19, 20 and 21 and through the circuit breaker 22 to a high voltage power supply source.

In this embodiment, the actuating mechanism and switch members of the grounding switch 18 are positioned in the enclosing case 23 as shown in Figs. 2 and 3. The enclosing case is suitable for mounting on the case 24 of a transformer, as shown in Fig. 3 or on a wall. In practice, the bottom, sides, back, front and top of the case are so fabricated that the assembled case is leak proof and suitable for containing an insulated liquid where desired. A valve 9 may be positioned in the bottom of the case 23 for withdrawing the insulating liquid in which the grounding switch is ordinarily immersed.

The grounding switch 18 is provided with three movable switch members 25, 26 and 27 carried in bushings 28, 29 and 30, respectively, which are suitably mounted on a bushing bridge 31. The ends of the bushing bridge 31 are attached in a suitable manner to racks 32 and 33, respectively, the racks being so mounted in guides (not shown) in the case that they are disposed for reciprocating movement when actuated, as hereinafter described.

The upper ends of the movable switch members 25, 26 and 27 are provided with terminals 34, 35 and 36 that are adapted to slidingly engage transformer terminal contact members 37, 38 and 39, respectively. The contact members 37, 38 and 39 are mounted on insulating bushings 40, 41 and 42 that are suitably mounted on the bushing bridge 43, the ends of which are bolted or otherwise permanently attached to the walls of the case 23.

As shown in Fig. 2, the contact members 37, 38 and 39 are suitably connected as by conductor straps 44, 45 and 46 through the terminal bushings 47, 48 and 49 that extend through the back of the case 23 and the transformer case 24 containing the windings 15, 16 and 17 to which the transformer terminal contact members 37, 38 and 39 are connected.

The lower ends of the movable switch members 25, 26 and 27 are provided with terminals 50, 51 and 52 that are adapted to slidingly engage line terminal contact members 53, 54 and 55, respectively. The contact members 53, 54 and 55 are carried by insulating bushings 56, 57 and 58, respectively, that are suitably mounted on the bushing bridge 59, the ends of which are bolted to the walls of the case 23. The contact members 53, 54 and 55 are connected by conductor straps 60, 61 and 62, respectively, through the line terminal bushings 63, 64 and 65 mounted in the bottom of the case and through the main line terminal bushing 66 to the conductors 19, 20 and 21 of the power source.

In order that the movable switch members 25, 26 and 27 may be electrically connected at all times to the conductors 19, 20 and 21, the line terminal contact members 53, 54 and 55 are in the form of an elongated knife switch of such length that at no time during a movement of the movable switch members 25, 26 and 27 will the sliding electrical engagement between the contact members 50, 51 and 52 and the line terminal contact members 53, 54 and 55, respectively, be broken.

In order to ground the conductors 19, 20 and 21 when the transformer 10 is not energized, contact members 67, adapted to engage the ground terminal contact members 70, 71 and 72 when the switch is actuated to "ground position", are provided on the lower end of movable switch members 25, 26 and 27. The ground terminal contact members 70, 71 and 72 are carried by the insulating bushings 73, 74 and 75 suitably mounted through the bottom of the case 23 and are electrically connected therethrough to the short circuiting bar 5 and the common ground 76.

In order to actuate the racks 32 and 33 to move the movable switch members 25, 26 and 27, gear sectors 77 and 78 adapted to engage the racks 32 and 33, respectively are suitably mounted on shafts 79 and 80 mounted through stuffing glands 81 and 82, respectively, positioned in the sides of the case 23. A segment 83 provided with a counter-balance wheel 84 to counter-balance the weight of the gear section 77 and to provide for maintaining the movable switch members 25, 26 and 27 in a desired position is also provided on the shafts 79 and 80.

In order to lock the movable switch members 25, 26 and 27 to close a circuit from the line terminal contact members to the transformer terminal contact members when the transformer 10 is energized, an electrical interlock 85 is provided in the case. The windings of the interlock are electrically connected through conductors 86 and 87, as viewed in Fig. 1, to the transformer 10.

As shown in Figs. 2 and 3, the armature 97 of the interlock 85 is in the form of an extended arm. When the transformer and consequently the windings of the interlock are energized, the armature 97 is adapted to engage one of the grooves 88, 88' and 88'', disposed about the periphery of the segment 83 to lock the actuating mechanism.

Adjustable stops 89 and 90 are provided in the case to limit the path of the movement of the movable switch members 25, 26 and 27 in response to a movement of the actuating mechanism, a rod 91 being provided on the racks 32 and 33 and projecting above and below the racks for abutting the stops 89 and 90 when the movable switch members are in "open position" and "ground position", respectively.

As viewed in Figs. 2 and 3 of the drawing, the three-position grounding switch 18 is in "transformer position". That is, the movable switch members 25, 26 and 27 bridge the line terminal contact members 53, 54 and 55 and the transformer terminal contact members 37, 38 and 39, respectively, to close a circuit from the power source to the transformer 10 through the circuit breaker 22 and conductors 19, 20 and 21. In this position the windings of the electrical interlock 85 are energized and the armature 97 is actuated to enter groove 88' of the segment 83 to lock the actuating mechanism in the "transformer position".

In order to actuate the switch members 25, 26 and 27 to either the "ground position" wherein the movable switch members bridge the line terminal contact members 53, 54 and 55 and the ground terminal contact members 70, 71 and 72 to "ground", or to the "disconnect position" in which the rod 91 abuts the stop 89, circuit breakers 14 and 22 must be opened to deenergize the transformer 10 and deenergize the windings of the interlock 85.

When the windings of the interlock 85 are deenergized the armature arm 97 is withdrawn from groove 88' and the movable switch members 25, 26 and 27 may be moved to "disconnect position" by actuating the shafts 79 and 80 by any suitable means such as by an operator's handle or a rope mechanism (not shown). In turning the shafts 79 and 80 in clockwise direction, the segments 83 and the gear sectors 77 and 78 are rotated in a clockwise direction as viewed in Fig. 3 to actuate the racks 32 and 33 to move in a vertical direction in their guides (not shown).

The linear movement of the racks 32 and 33 causes the assembly of the movable switch members 25, 26 and 27 on the bushing bridge 31 to so move in a vertical direction that the contact members 34, 35 and 36 on the upper ends of the movable switch members disengage the transformer terminal contact members 37, 38 and 39, respectively, the contact members 50, 51 and 52 on the lower end of the movable switch members maintaining their electrical engagement with the line terminal contact members 53, 54 and 55. The vertical movement of the movable switch members to the "disconnect position" is limited as hereinbefore described by the stops 89 positioned on the walls of the case 23.

In operation, when it is desired to ground the feeder to the transformer, the shafts 79 and 80 are rotated in a counter-clockwise direction, as viewed in Fig. 3, to actuate the movable switch members from their "disconnect position" hereinbefore described.

In moving from the "disconnect position" to the "ground position" the movable switch members move progressively from the open circuit or "disconnect position" to and through the "transformer position", to the "ground position".

If either of the circuit breakers 14 or 22 are closed when the movable switch members are actuated to the "transformer position", the transformer 10 and the windings of the electrical interlock 85 become so energized that the armature 97 of the interlock is moved into the groove 88' of the segment 83 to lock the switch in "transformer position". Before the movable switch members can then me moved to the "ground position" circuit breakers 14 and 22 must be opened, deenergizing the transformer 10 and the windings of the electrical interlock 85.

When the interlock 85 is thus deenergized, the shafts 79 and 80 may be rotated in a counter-clockwise direction, as viewed in Fig. 3, to actuate the movable contact members to the "ground position" where contact members 67 on the lower ends of the movable switch members 25, 26 and 27 engage the ground terminal contact members 70, 71 and 72 to close a circuit from the conductors 19, 20 and 21 to the ground 76.

It is thus evident that with the grounding switch of this invention the feeder cannot be grounded until after the transformer is deenergized. It is further evident that the mechanism of the grounding switch hereinbefore described is such that the desired positions of the switch may be obtained through reciprocal movement of the movable contact members and that the desired operation of connecting in "transformer position" before entering "ground position" from an open circuit or "disconnect position" is attained without the aid of mechanical interlocks.

Further advantages are obtained in the grounding switch of this invention by translating rotary movement necessary in actuating the mechanism into linear movement to obtain the reciprocating movement of the movable switch members, since the actuating mechanism may thereby be simplified. By providing the reciprocating movement, the movable contact members can be operated from their open circuit or "disconnect position" only in a direction to close the switch in its "transformer position", from which position it cannot be operated to the "ground position" unless the transformer is deenergized. This progressive movement of the movable switch members accomplishes the desired result of preventing the operation of the switch from its open circuit position except toward its "transformer position".

Although this invention has been described with reference to a particular embodiment thereof other and various modifications thereof are possible. It is, therefore, not to be restricted except insofar as is necessitated by the prior art and the scope of the appended claims.

I claim as my invention:

1. In a transformer grounding switch, in combination, a transformer terminal contact member, a line terminal contact member, a ground contact member, a switch disposed for movement to electrically connect the line terminal contact member to the transformer terminal contact member or the line terminal contact member to the ground contact member, the switch being also disposed for movement to open circuit position where it is in contact with the line terminal contact member but does not bridge a plurality of contact members, means for actuating the switch member, the ground and line terminal contact members being so disposed that as the switch is moved progressively from open circuit position it bridges the transformer and line terminal contact members and then ground and line terminal contact members which positions are generally designated transformer and ground positions respectively, and means cooperative to lock the switch in transformer position if the transformer is energized.

2. In a transformer grounding switch, in combination, a transformer terminal contact member, a line terminal contact member, a ground contact member, a switch disposed for movement to electrically connect the line terminal contact member to the transformer terminal contact member or the line terminal contact member to the ground contact member, the switch being also disposed for movement to open circuit position where it is in contact with the line terminal contact member but does not bridge a plurality of contact members, means for limiting the extent of the movement of the switch member in the direction of the open circuit position, the transformer terminal contact member being disposed between the said limiting means and the ground contact member, means for so actuating the switch member that it progressively moves from the open circuit position to bridge the transformer and line terminal contact members and then bridge the ground and line terminal contact members which positions are generally designated transformer and ground positions respectively, and means cooperative to lock the switch in transformer position when the transformer and line terminal contact members are bridged if the transformer is energized.

3. In a transformer grounding switch for electrically connecting the transformer to line or line to ground, in combination, a plurality of contact members, the contact members being electrically connected to ground, line and transformer respectively, a switch member for bridging the contact members disposed for reciprocating movement to different positions including an open circuit position where it does not bridge a plurality of contact members, means for limiting the extent of the movement of the switch member in the direction of the open circuit position, the contact member connected to the transformer being disposed between the said limiting means and the contact member connected to the ground, means for actuating the switch member, said actuating means being disposed to move the switch member progressively from the open circuit position to bridge the contact members electrically connected to the transformer and line respectively and then to bridge the contact members electrically connected to the ground and line respectively which positions are generally designated transformer and ground positions respectively, and means cooperative to lock the switch in transformer position if the transformer is energized.

4. In a transformer grounding switch for electrically connecting the transformer to line or line to ground, in combination, a plurality of contact members, the contact members being electrically connected to ground, line and transformer respectively, a switch member for bridging the contact members disposed for reciprocating movement to different positions including an open circuit position where it does not bridge a plurality of contact members, means for limiting the extent of the movement of the switch member in the direction of the open circuit position, the contact member connected to the transformer being disposed between the said limiting means and the contact member connected to the ground, means for actuating the switch member, said actuating means being disposed to move the switch member progressively from the open circuit position to bridge the contact members electrically connected to the transformer and line respectively and then to bridge the contact members electrically connected to the ground and line respectively which positions are generally designated transformer and ground positions respectively, means disposed between the actuating means and switch member for translating rotary movement into linear movement, and means cooperative to lock the switch in transformer position if the transformer is energized.

5. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it does not bridge a plurality of contact members, means for actuating the switch member, said actuating means being disposed to move the switch member progressively in the following sequence "open", "transformer" and "ground", the line contact member being so disposed that the electrical connection between the switch member and the line contact member is maintained for all positions of the switch member including open circuit position, and means cooperative to lock the switch in transformer position when the transformer and line terminal contact members are bridged if the transformer is energized.

6. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it is in contact with the line contact member but does not bridge a plurality of contact members, means for limiting the extent of the movement of the switch member in the direction of the open circuit position, means for actuating the switch member, said actuating means being disposed to move the switch member progressively from the open circuit position to bridge the contact members electrically connected to the transformer and line, respectively, and then to bridge the contact members electrically connected to the ground and line, respectively, which positions are generally designated transformer and ground positions, respectively, means comprising a rack and gear segment cooperating therewith disposed between the actuating means and switch member for translating rotary movement into linear movement, and means cooperative to lock the switch in transformer position if the transformer is energized.

HENRY S. GATES.